(12) United States Patent
Kim et al.

(10) Patent No.: US 10,109,244 B2
(45) Date of Patent: Oct. 23, 2018

(54) DISPLAY DEVICE

(71) Applicant: SAMSUNG DISPLAY CO., LTD., Yongin-Si, Gyeonggi-Do (KR)

(72) Inventors: Yeun Tae Kim, Suwon-Si (KR); Hee-Keun Lee, Suwon-Si (KR); Jaekeun Lim, Suwon-Si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 0 days.

(21) Appl. No.: 14/930,808

(22) Filed: Nov. 3, 2015

(65) Prior Publication Data

US 2016/0055809 A1    Feb. 25, 2016

Related U.S. Application Data

(63) Continuation of application No. 13/945,316, filed on Jul. 18, 2013, now Pat. No. 9,201,258.

(30) Foreign Application Priority Data

Jan. 23, 2013    (KR) .................... 10-2013-0007572

(51) Int. Cl.
*G09G 3/36* (2006.01)
*H04N 9/30* (2006.01)
(Continued)

(52) U.S. Cl.
CPC ..... *G09G 3/3607* (2013.01); *G02F 1/133377* (2013.01); *G09G 3/3655* (2013.01);
(Continued)

(58) Field of Classification Search
CPC .................... H04N 9/30; G09G 3/36
(Continued)

(56) References Cited

U.S. PATENT DOCUMENTS 4,123,140 A    10/1978    Ryan et al.
5,986,729 A *  11/1999    Yamanaka ............ G02F 1/1333
                                                349/153
(Continued)

FOREIGN PATENT DOCUMENTS

JP    2000-330130       11/2000
KR    10-2003-0063656    7/2003
(Continued)

OTHER PUBLICATIONS

English Abstract for Publication No. 2000-330130.
English Abstract for Publication No. 10-2003-0063656.

*Primary Examiner* — Sheng Zhu
(74) *Attorney, Agent, or Firm* — F. Chau & Associates, LLC

(57) ABSTRACT

A display device includes a substrate and pixels arranged on the substrate in a matrix form. The substrate includes a display area in which the pixels are arranged and a non-display area disposed adjacent to a side of the display area. Each pixel includes a cover layer that extends in a row direction that includes a sidewall portion connected to the substrate and a cover portion spaced apart from the substrate and connected to the sidewall portion to define a tunnel-shaped cavity on the substrate. A width of the sidewall portion between adjacent pixels is less than a width of the sidewall portion disposed at an outermost position, and the cover layer seals one side of the tunnel-shaped cavity in the pixels arranged in a first row and a last row.

20 Claims, 13 Drawing Sheets

(51) Int. Cl.
 *G02F 1/1333* (2006.01)
 *G02F 1/167* (2006.01)

(52) U.S. Cl.
 CPC ....... *H04N 9/30* (2013.01); *G02F 2001/1672* (2013.01); *G09G 2310/027* (2013.01)

(58) Field of Classification Search
 USPC ........................................................ 257/88
 See application file for complete search history.

(56) References Cited

U.S. PATENT DOCUMENTS

| | | | |
|---|---|---|---|
| 6,141,072 A | | 10/2000 | Drabik et al. |
| 7,123,319 B2 | | 10/2006 | Broer et al. |
| 7,612,860 B2 | * | 11/2009 | Kim et al. .................... 349/158 |
| 2003/0025868 A1 | * | 2/2003 | Hiroshima .......... G02F 1/13394 |
| | | | 349/156 |
| 2006/0146267 A1 | | 7/2006 | Choi et al. |
| 2009/0231304 A1 | | 9/2009 | Lee et al. |
| 2010/0014036 A1 | | 1/2010 | Caplet |
| 2010/0196679 A1 | * | 8/2010 | Morishima .................. 428/201 |
| 2012/0057109 A1 | * | 3/2012 | He et al. ...................... 349/106 |
| 2012/0062448 A1 | * | 3/2012 | Kim ................. G02F 1/133377 |
| | | | 345/55 |
| 2013/0329152 A1 | * | 12/2013 | Zhong .............. G02F 1/133377 |
| | | | 349/43 |

FOREIGN PATENT DOCUMENTS

| | | |
|---|---|---|
| KR | 10-2013-0134153 | 12/2013 |
| KR | 10-2014-0025081 | 3/2014 |
| KR | 10-2014-0025739 | 3/2014 |

\* cited by examiner

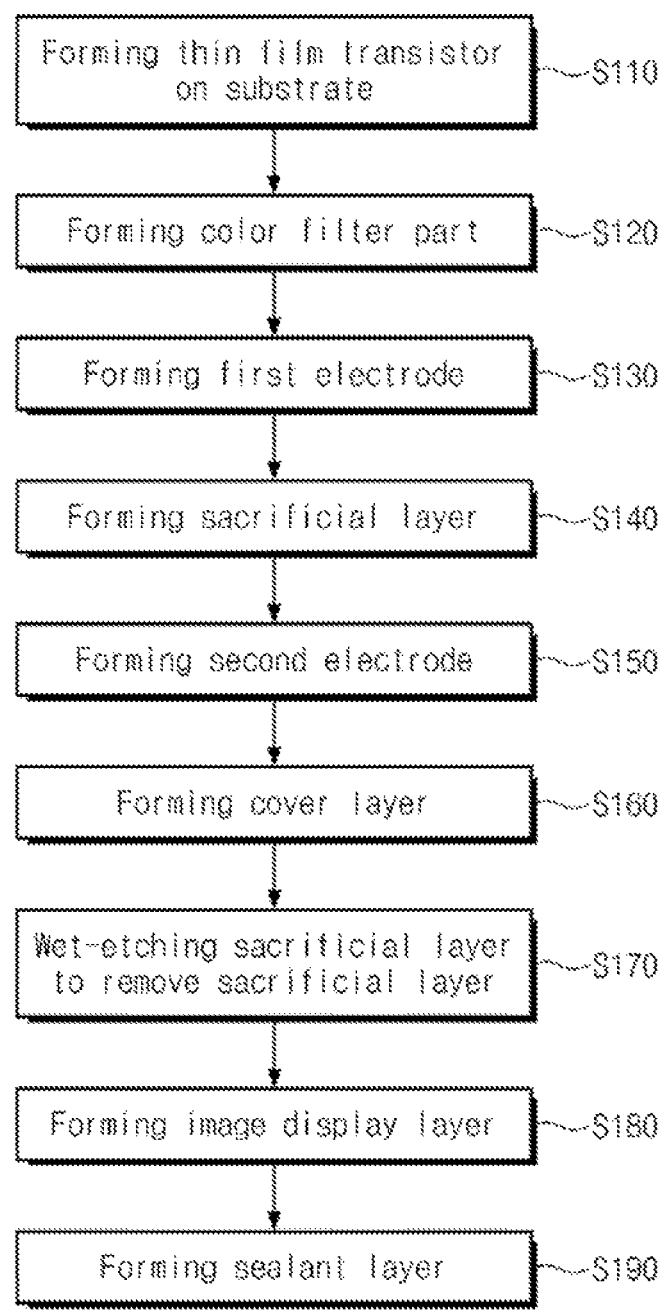

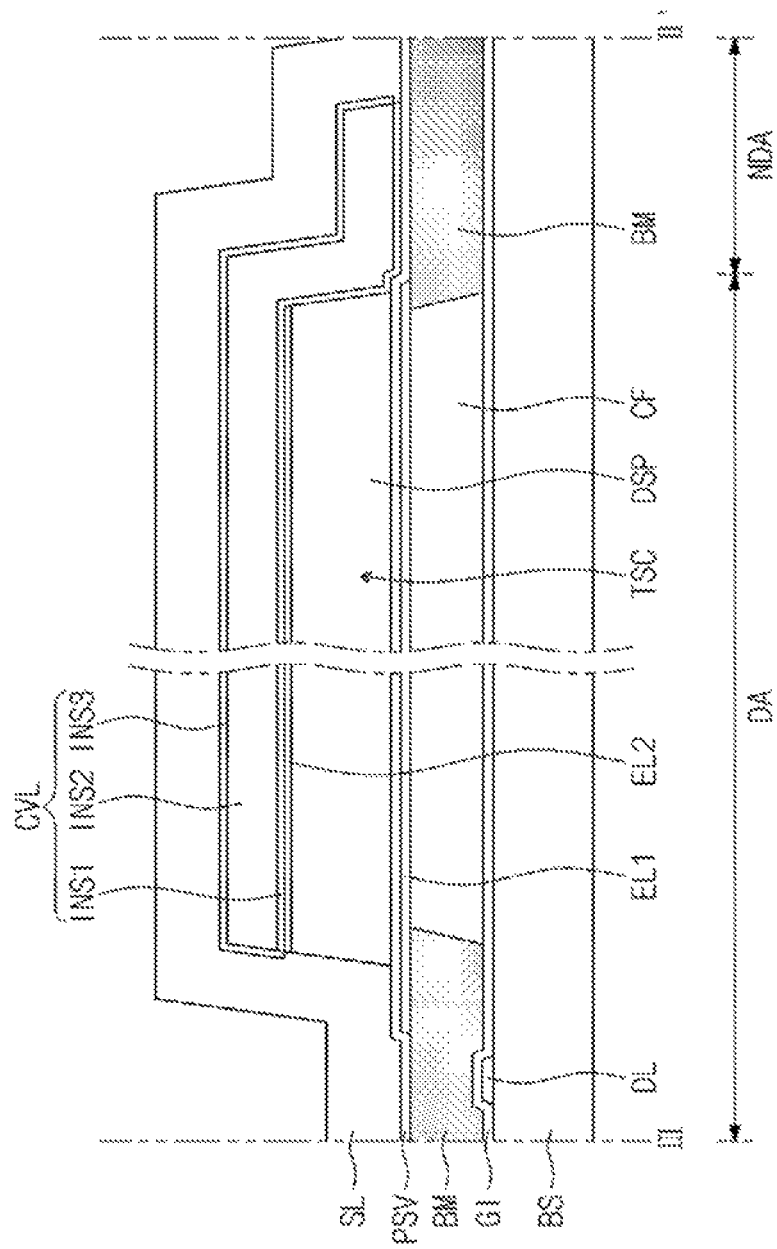

DISPLAY DEVICE

CROSS-REFERENCE TO RELATED APPLICATIONS

This U.S. non-provisional patent application is a continuation of, and claims priority from, U.S. application Ser. No. 13/945,316, filed on Jul. 18, 2013 in the U.S. Patent and Trademark Office, which in turn claims priority under 35 U.S.C. § 119 from Korean Patent Application No. 10-2013-0007572, filed on Jan. 23, 2013 in the Korean Intellectual Property Office, the contents of which are herein incorporated by reference in their entirety.

BACKGROUND

1. Technical Field

The present disclosure relates to a display device.

2. Discussion of the Related Art

In recent years, flat screen display devices such as liquid crystal display devices, electrophoretic display devices, etc., have become more widely used instead of cathode ray tubes.

A display device includes two substrates facing each other and an image display unit interposed between the two substrates, such as a liquid crystal layer, an electrophoretic layer, etc. The two substrates are coupled to each other while facing each other and spaced apart from each other by a distance that allows the image display unit to be disposed therebetween.

To manufacture a display device, a spacer is formed on one of the two substrates to maintain the distance between the two substrates, and the other substrate is attached to the spacer using an adhesive.

As a result, a display device manufacturing process may be complicated and expensive.

SUMMARY

Embodiments of the present disclosure provide a display device having high stress resistance.

Embodiments of the present disclosure provide a display device including a substrate and pixels arranged on the substrate in a matrix form. The substrate includes a display area in which the pixels are arranged and a non-display area disposed adjacent to a side of the display area. Each of the pixels includes a cover layer that defines a tunnel-shaped cavity on the substrate. The cover layer extends in a row direction and includes a sidewall portion connected to the substrate and a cover portion spaced apart from the substrate and connected to the sidewall portion. A width of the sidewall portion between the pixels adjacent to each other is smaller than a width of the sidewall portion disposed at an outermost position. The cover layer seals one side of the tunnel-shaped cavity in the pixels arranged in a first row and a last row The display device further includes color filters corresponding to each disposed between the substrate and the image display layer, and a black matrix that surrounds the color filters. A width of the black matrix between adjacent pixels is less than the width of the sidewall portion of the non-display area.

The display device further includes a thin film transistor disposed on the substrate and connected to the electrode, and a gate line that extends in a row direction and a data line that extends in a column direction, which are disposed on the substrate and connected to the thin film transistor. The display device further includes a gate driving circuit disposed adjacent to at least one side of a display area thereof to apply a gate signal to the gate line. The cover layer covers the gate driving circuit. The gate driving circuit includes a plurality of thin film transistors each comprising an amorphous silicon semiconductor thin film.

The cover layer includes a plurality of insulating layers sequentially stacked on the substrate, and the insulating layers include a first inorganic insulating layer, an organic insulating layer, and a second inorganic insulating layer, which are sequentially stacked on the substrate.

Embodiments of the present disclosure provide a method of manufacturing a display device. The method includes forming a thin-film-transistor (TFT) and a gate insulator on a substrate, forming a color filter part including a plurality of color filters and a black matrix on the substrate and covering the TFT, forming a first electrode on the color filter part, and a passivation layer on the first electrode, forming a sacrificial layer on the passivation layer to cover a display area of the substrate, forming a second electrode on the sacrificial layer, forming a cover layer on the substrate and the second electrode, but not on one end portion of the sacrificial layer in one direction, wherein the one end portion is open, removing the sacrificial layer through the open end portion by an etch process to form a tunnel-shaped cavity (TSC) between an upper surface of the passivation layer and a lower surface of the second electrode and the end portions, providing an image display layer to the TSC through the open end portion from which the sacrificial layer was removed, wherein the image display layer flows into the TSC due to capillary action; and forming a sealant layer to surround the TSC and seal the open end portion of the TSC.

A portion of the cover layer that is formed over the sacrificial layer corresponds to a cover portion, and a portion of the cover layer that is formed in an area in which the sacrificial layer is not formed corresponds to a sidewall portion, and a portion of the sidewall portion extends outward into an area corresponding to pixels disposed at an outermost position on the substrate.

Further embodiments of the present disclosure provide a display device including a substrate, pixels arranged on the substrate in a matrix form, a line part on the substrate that applies signals to the pixels, and a thin film transistor on the substrate that drives the pixels. The line part includes first and second gate lines that extend substantially parallel to each other in a first direction on the substrate, and first and second data lines that extend substantially parallel to each other in a second direction crossing the first direction. The thin film transistor includes a first, second, and third thin film transistors. Each pixel includes a pixel electrode that controls an image display, wherein each pixel electrode includes a first sub-pixel and a second sub-pixel. The first sub-pixel electrode includes a first trunk portion and a plurality of first branch portions that radially extend from the first trunk portion, and the second sub-pixel electrode includes a second trunk portion and a plurality of second branch portions that radially extend from the second trunk portion.

Each of the first and second trunk portions has a cross shape that divide each respective sub-pixel electrode into a plurality of domains, and the branch portions extend in different directions according to the domains. In each domain, the branch portions extend substantially parallel to each other and are spaced apart from each other.

The first thin film transistor includes a first gate electrode connected the first gate line, a first source electrode connected to the first data line and a first drain electrode connected to the first sub-pixel electrode. The second thin film transistor includes a second gate electrode connected to the first gate line, a second source electrode connected to the first data line, and a second drain electrode connected to the second sub-pixel electrode. The third thin film transistor includes a third gate electrode connected to the second gate line, a third source electrode that extends from a drain electrode of the second thin film transistor, and a third drain electrode connected to a coupling electrode of a coupling capacitor.

The display device further includes a first storage electrode that includes a first storage line that extends in the first direction, and first and second branch electrodes branched from the first storage line that extend in the second direction, and a second storage electrode that includes a second storage line that extends in the second direction and third and fourth branch electrodes branched from the second storage line SL2 that extend in the second direction. The second branch electrode is connected to an opposite electrode of the coupling capacitor, the first sub-pixel electrode partially overlaps the first storage line and the first and second branch electrodes to form a first storage capacitor, and the second sub-pixel electrode partially overlaps the second storage line and the third and fourth branch electrodes to form a second storage capacitor.

According to the above, a display device may have high stress resistance to protect the display device from being deformed before or after being manufactured even though stress is applied to the display device.

BRIEF DESCRIPTION OF THE DRAWINGS

FIG. 4 is a flowchart of a method of manufacturing a display device according to an exemplary embodiment of the present disclosure.

FIG. 5C is a cross-sectional view of a display device according to another exemplary embodiment of the present disclosure, which corresponds to the line III-III' shown in FIG. 2.

DETAILED DESCRIPTION OF EXEMPLARY EMBODIMENTS

It will be understood that when an element or layer is referred to as being "on", "connected to" or "coupled to" another element or layer, it can be directly on, connected or coupled to the other element or layer or intervening elements or layers may be present. Like numbers refer to like elements throughout.

Hereinafter, exemplary embodiments of the present disclosure will be explained in detail with reference to the accompanying drawings.

Figure 1:
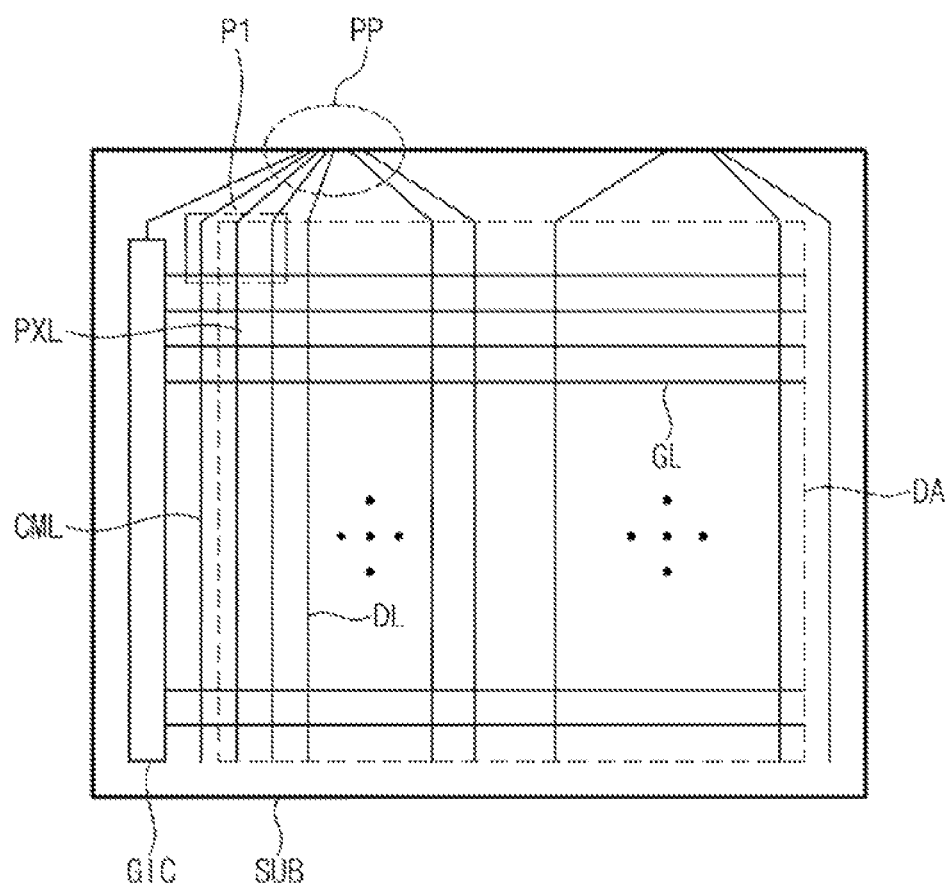
FIG. 1 is a plan view of a display device according to an exemplary embodiment of the present disclosure.
Figure 2:
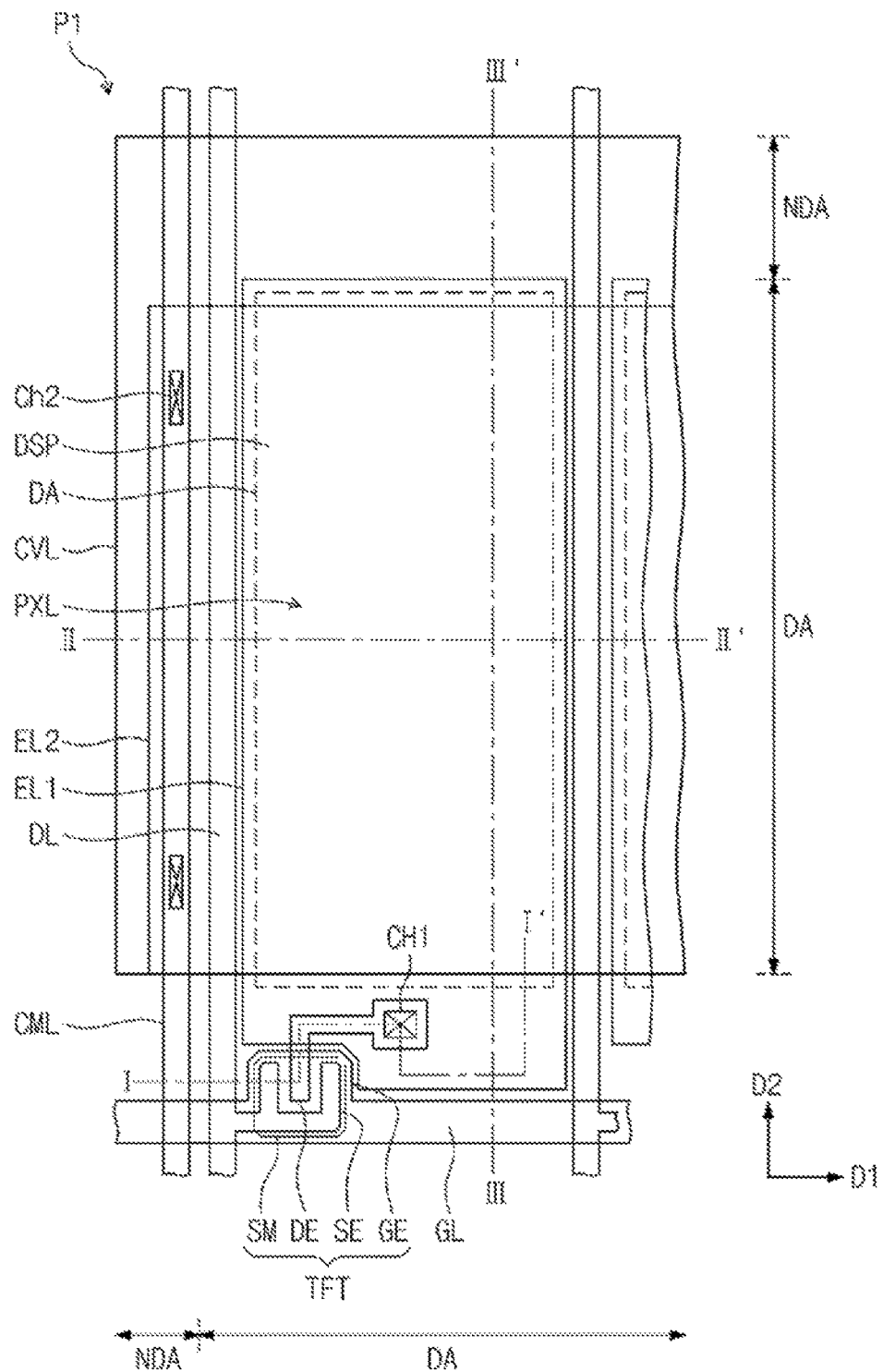
FIG. 2 is a plan view of a portion of the display device shown in FIG. 1.
Figure 3A:
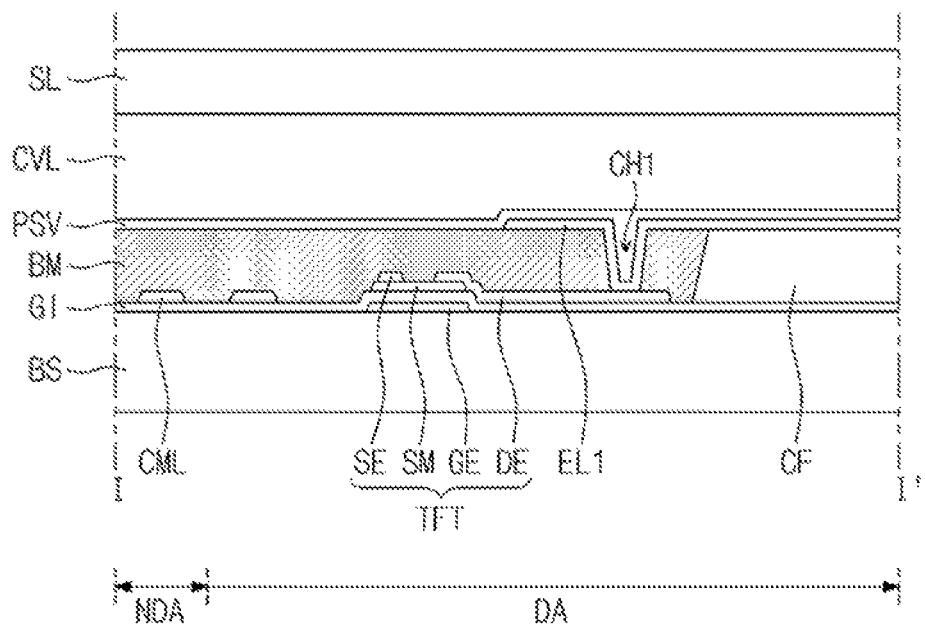
FIG. 3A is a cross-sectional view taken along a line I-I' shown in FIG. 2.
Figure 3B:
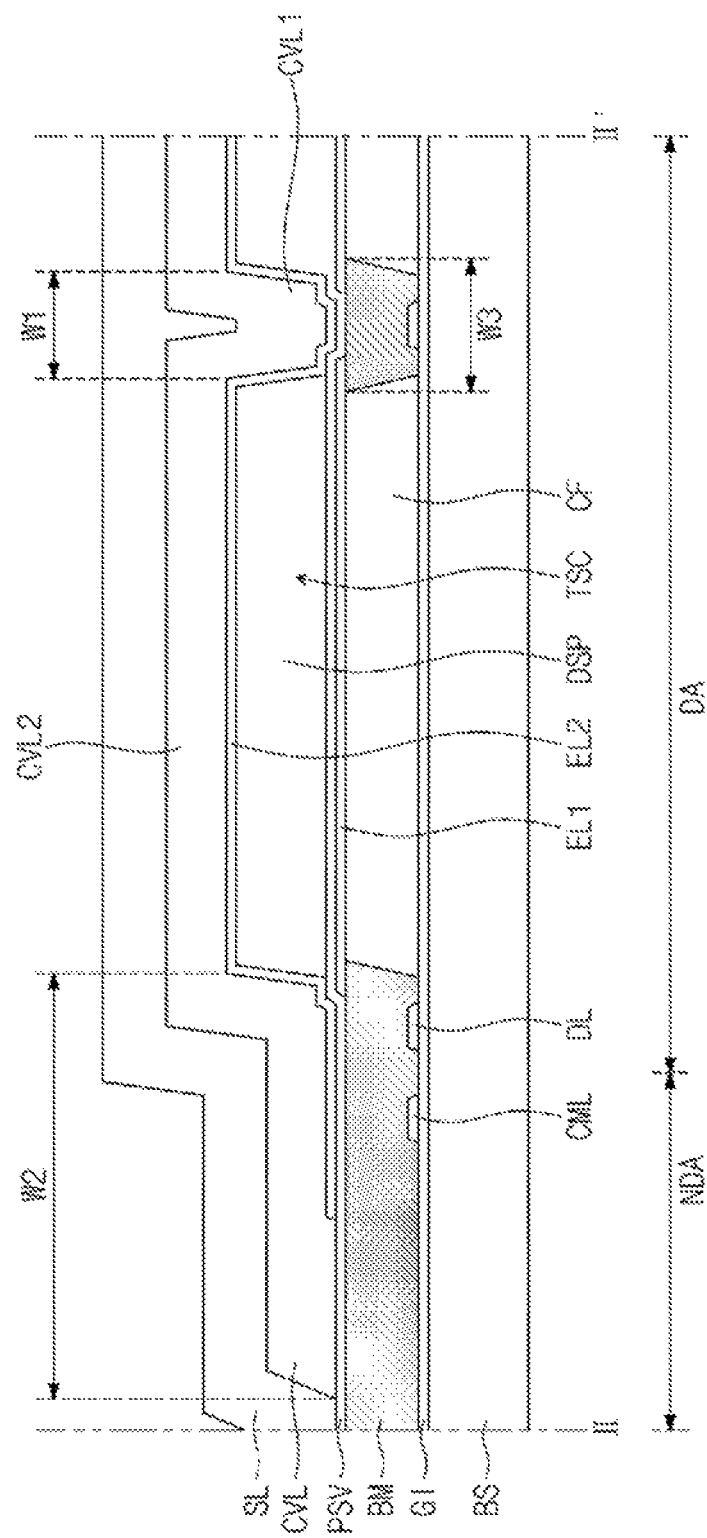
FIG. 3B is a cross-sectional view taken along a line II-II' shown in FIG. 2.
Figure 3C:
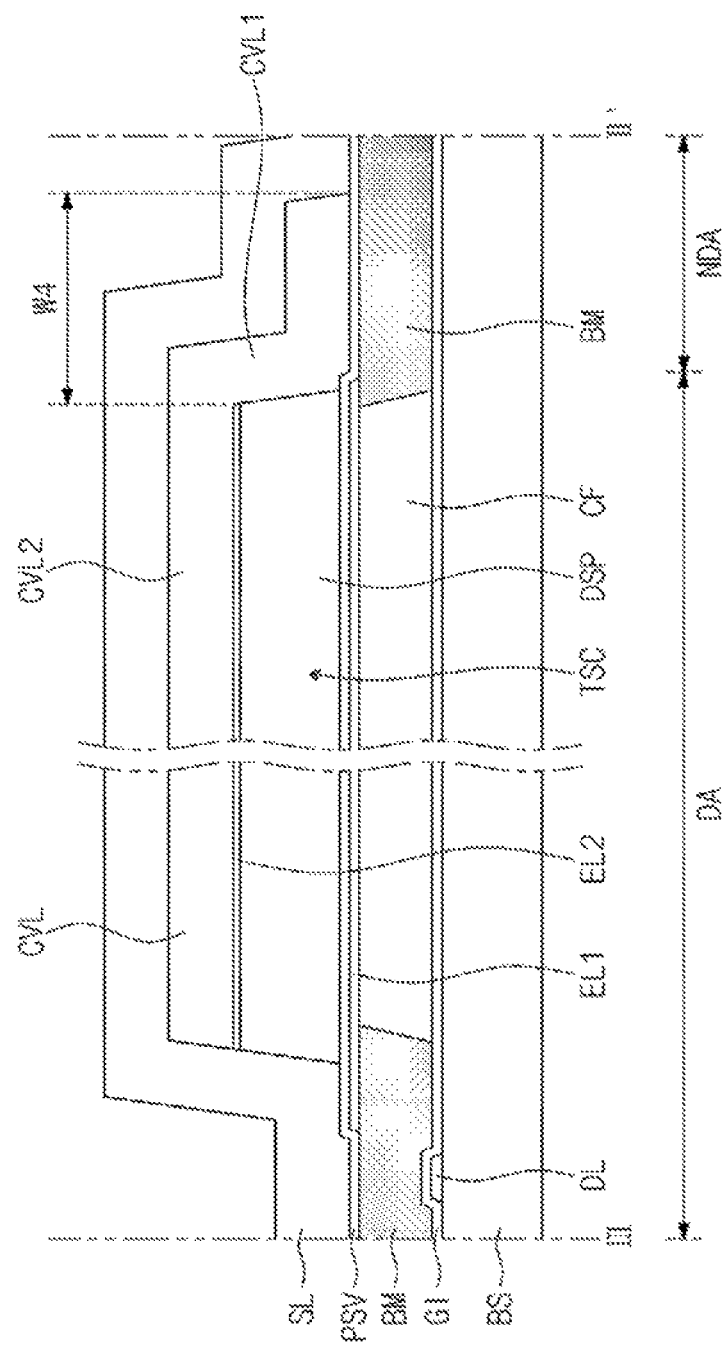
FIG. 3C is a cross-sectional view taken along a line III-III' shown in FIG. 2.

FIG. 1 is a plan view of a display device according to an exemplary embodiment of the present disclosure and FIG. 2 is a plan view of a portion of the display device shown in FIG. 1. FIG. 3A is a cross-sectional view taken along a line I-I' shown in FIG. 2, FIG. 3B is a cross-sectional view taken along a line II-II' shown in FIG. 2, and FIG. 3C is a cross-sectional view taken along a line III-III' shown in FIG. 2.

The display device shown in FIG. 1 includes a plurality of pixels PXL arranged in a matrix form with a plurality of rows and a plurality of columns. Since the pixels PXL each have the same configuration and function, for the convenience of explanation, hereinafter, one pixel will be described in detail. Here, an exemplary, non-limiting pixel has a rectangular shape elongated in one direction, but the shape of the pixel is not limited to a rectangular shape. In other embodiments, a pixel may have various other shapes, such as a V shape, a Z shape, etc., when viewed in a plan view.

Referring to FIGS. 1, 2, 3A, 3B, and 3C, a display device includes a substrate BS upon which the pixels PXL are disposed.

The substrate BS may be a transparent or non-transparent insulating substrate, such as a silicon substrate, a glass substrate, a plastic substrate, etc. The substrate BS includes a display area DA in which the pixels PXL are arranged and a non-display area NDA disposed adjacent to at least one side of the display area DA. The display area DA includes pixel areas corresponding to the pixels PXL in a one-to-one correspondence, and the pixel areas are arranged in a matrix form.

The substrate BS includes a line part disposed on the display area DA and the non-display area NDA to apply signals to the pixels PXL and a thin film transistor TFT to drive the pixels PXL.

The line part includes a gate line GL, a gate driving circuit GIC, a data line DL, a common voltage line CML, and a pad part PP.

The gate line GL is disposed in the display area DA of the substrate BS and extends in a first direction D1. The gate line GL extends into the non-display area NDA and connects to the gate driving circuit GIC.

A gate insulating layer GI is disposed on the substrate BS to cover the gate line GL. The gate insulating layer GI includes an insulating material, such as silicon nitride, silicon oxide, etc.

The data line DL is disposed on the substrate BS to be insulated from the gate line GL by the gate insulating layer GI. The data line DL extends in a second direction D2 that crosses and is substantially perpendicular to the first direction D1.

In a present exemplary embodiment, the row direction and the column direction are referred to as the first direction D1 and the second direction D2, respectively, but they are not limited thereto. According to embodiments, the column direction and the row direction may be referred to as the first direction D1 and the second direction D2, respectively.

The common voltage line CML is disposed in the non-display area NDA along at least a portion of an end portion of the display area DA. In a present exemplary embodiment, the common voltage line CML is disposed on both sides of the display area DA in the first direction D1, but is not limited thereto. In other exemplary embodiments, the common voltage line CML may be disposed to surround the display area DA. In addition, the common voltage line CML may be formed of the same material as and be disposed on the same layer as the data line, but is not limited thereto. In other exemplary embodiments, the common voltage line CML may be formed of the same material as and be disposed on the same layer as the gate line GL.

The gate driving circuit GIC is disposed adjacent to at least one side of the display area DA and is connected to the gate line GL to apply a gate signal to the gate line GL. The gate driving circuit GIC includes a plurality of thin film transistors TFT. In a present exemplary embodiment, the thin film transistor TFT includes an amorphous silicon semiconductor thin film.

The pad part PP is disposed in the non-display area NDA and is electrically connected to external lines. The gate driving circuit GIC, the data line DL, and the common voltage line CML receive signals through the pad part PP from the external lines to drive the pixels PXL. In particular, the data line DL is connected to a data driving circuit (not shown) through the pad part PP and the data driving circuit applies image signals to the data line DL through the pad part PP.

In a present exemplary embodiment, the pad part PP is disposed at one end of the data line DL and the gate driving circuit GIC is disposed at one end of the gate line GL, but they are not limited thereto. For example, according to embodiments, the gate driving circuit or the data driving circuit may be manufactured in a chip, and then mounted on the substrate using a chip-on-glass technique. Alternatively, according to embodiments, the gate driving circuit and the data driving circuit may be disposed on a flexible printed circuit board, and then attached to the gate line and the data line, respectively, using an adhesive member, such as a conductive adhesive film. In this case, a gate pad part and a data pad part may be provided to an end portion of the gate line and the data line, respectively.

The thin film transistor TFT is connected to the gate line GL and the data line DL and includes a gate electrode GE, a semiconductor layer SM, a source electrode SE, and a drain electrode DE.

The gate electrode GE protrudes from the gate line GL or is disposed on a portion of the gate line GL. The gate line GL and the gate electrode GE are formed of a metal. The metal may include nickel, chromium, molybdenum, aluminum, titanium, copper, tungsten, or an alloy thereof. The gate line GL and the gate electrode GE may have a single-layer structure or a multi-layer structure of the above-mentioned metals. For example, the gate line GL and the gate electrode GE may have a triple-layer structure of molybdenum, aluminum, and molybdenum, which are sequentially stacked on one another, a double-layer structure of titanium and copper sequentially stacked, or a single-layer structure of an alloy of titanium and copper.

The gate insulating layer GI is disposed over the substrate BS to cover the gate electrode GE.

The semiconductor layer SM is provided on the gate insulating layer GI to correspond to the gate line GL. The source electrode SE branches from the data line DL and overlaps the semiconductor layer SM. The drain electrode DE overlaps the semiconductor layer SM and is spaced apart from the source electrode SE. The semiconductor layer SM serves as a conductive channel between the source electrode SE and the drain electrode DE.

The source electrode SE and the drain electrode DE may be formed of a conductive material, such as a metal. Each of the source electrode SE and the drain electrode DE may be formed of a single metal, two or more metals, or a metal alloy. For example, each of the source electrode SE and the drain electrode DE may include nickel, chromium, molybdenum, aluminum, titanium, copper, tungsten, or an alloy thereof. In addition, each of the source electrode SE and the drain electrode DE may have a single-layer structure or a multi-layer structure. For example, each of the source and drain electrodes SE and DE may have a double-layer structure of titanium and copper.

A color filter part may be disposed on the thin film transistor TFT. The color filter part may be omitted from or disposed on the pixels PXL. The color filter part includes color filters CF and a black matrix BM. Each color filters CF is disposed to correspond to a respective pixel area.

Each color filter CF imparts a color to the light passing through a corresponding pixel of the pixels PXL. The color filters CF include a red filter, a green filter, and a blue filter. The red, green, and blue filters are arranged to correspond to the pixels PXL in one-to-one correspondence. In addition, the color filters CF may further include a white filter. The color filters CF may be arranged to allow adjacent pixels to have different colors. Although not shown in figures, color filters CF adjacent to each other may partially overlap with each other in a boundary region between the pixels.

The black matrix BM is disposed in the display area DA to block light not needed to display the image. The black matrix BM prevents light leakage at the edge of the image display layer, which is caused by the liquid crystal molecules, and color mixing, which occurs at the pixel edges due to the overlap of the color filters CF. The black matrix BM is provided on at least one side of each color filter CF, and may surround each color filter CF. In addition, to block light leakage caused by an electric field formed by the line part and the thin film transistor TFT, the black matrix BM is provided in an area in which the gate line GL and the data line DL are disposed and an area in which the thin film transistor TFT is disposed. In this case, to cover a portion of the line part and/or the thin film transistor TFT, the black matrix BM is wider than an area in which the line part and/or the thin film transistor TFT are formed.

Although not shown in figures, the color filter CF and the black matrix BM overlap each other in an area adjacent to the boundary region of each pixel PXL. The black matrix BM may extend into the non-display area NDA. For example, the black matrix BM may be disposed in the area in which the common voltage line CML or the gate driving circuit GIC is formed.

The color filter part is provided with a first contact hole CH1 formed therethrough to expose a portion of the drain electrode DE of the thin film transistor TFT. A first electrode EL1, which will be described below, connects to the thin film transistor TFT through the first contact hole CH1.

Although not shown in figures, a protective layer may be disposed between the thin film transistor TFT and the color filter part to protect the channel of the thin film transistor TFT. The protective layer covers the semiconductor layer SM exposed.

The pixel is disposed on the color filter part of the substrate BS. The pixel PXL includes a cover layer CVL that, together with the substrate BS, defines a tunnel-shaped cavity TSC, an image display layer DSP disposed in the tunnel-shaped cavity TSC, an electrode that controls the image display layer DSP, and a sealant layer SL that seals the tunnel-shaped cavity TSC.

The electrode is formed in the image display layer DSP, and includes a plurality of electrodes that are spaced apart from and insulated from each other. In a present exemplary embodiment, the electrode may include two electrodes, such as first and second electrodes EL1 and EL2 that are insulated from each other.

The first electrode EL1 is disposed on the color filter part and connects to the thin film transistor TFT through the first contact hole CH1. A passivation layer PSV may be disposed on the first electrode EL1 to protect the first electrode EL1. Alternatively, the passivation layer PSV may be omitted. The passivation layer PSV may include an inorganic insulating material or an organic insulating material. The first contact hole CH1 is formed by partially removing the black matrix BM or the color filters CF, to connect the first electrode EL1 to the thin film transistor TFT.

The cover layer CVL extends in the first direction D1 on the passivation layer PSV, but is not limited thereto. That is, the cover layer CVL may extend in a direction different from the first direction D1. The cover layer CVL includes a sidewall portion CVL1 and a cover portion CVL2 that defines the tunnel-shaped cavity TSC in each pixel PXL. To this end, the sidewall portion CVL1 makes contact with the passivation layer PSV and the cover portion CVL2 is spaced apart from the substrate BS and connects to the sidewall portion CVL1.

The sidewall portion CVL1 is disposed to correspond to an edge in the second direction D2 of each pixel PXL. That is, the sidewall portion CVL1 is disposed corresponding to an area in which the data line DL is disposed, and the cover portion CVL2 connects sidewall portions CVL1 of the adjacent data lines DL. Here, the sidewall portion CVL1 and the cover portion CVL2 may be integrally formed with each other. Accordingly, the cover layer CVL is spaced upward from the passivation layer PSV to form a predetermined space and directly contacts other layers along the second direction D2 in the area having the data line DL so as not to form a space.

As a result, the tunnel-shaped cavity TSC has a shape that extends in the second direction D2, and both end portions of the tunnel-shaped cavity TSC in the second direction D2 are open since the cover layer CVL is not formed in the end portions of the tunnel-shaped cavity TSC.

However, according to a present exemplary embodiment, the end portions of the tunnel-shaped cavity TSC are open for the pixels PXL except for those pixels in a first row and a last row. In these rows, one end portion located at an outermost position is sealed by the cover layer CVL and the other end portion is open where there is no cover layer CVL. In this case, pixels in the first and last rows may be dummy pixels in which no image is displayed.

In a present exemplary embodiment, a portion of the sidewall portion CVL1 corresponding to the pixels PXL disposed at the outermost position extends outward. In detail, the sidewall portion CVL1 disposed at the outermost position of the pixels PXL in the first and last columns extends outward. Let a width in the first direction D1 of the sidewall portion CVL1 disposed between adjacent pixels PXL be referred to as a first width W1 and a width in the first direction D1 of the sidewall portion CVL1 disposed at the outermost position of the pixels PXL in the first and last columns be referred to as a second width W2. Then, the second width W2 is greater than the first width W1. In addition, let a width in the first direction D1 of the black matrix BM disposed between the adjacent pixels PXL be referred to as a third width W3. Then, the third width W3 is greater than or equal to the first width W1.

For example, the first width W1 may be in a range from about 10 micrometers to about 25 micrometers and the second width W2 may be greater than or equal to about 12 micrometers. In addition, the second width W2 may be greater than or equal to two times the first width W1 or greater than or equal to about 100 micrometers. Here, an upper limit of the first width W1 is not limited thereto and may be varied depending on a structure of the display device. For example, the first width W1 may be about 10 mm, and the third width W3 may in a range from about 16 micrometers to about 30 micrometers.

In addition, in a present exemplary embodiment, the sidewall portion CVL1 disposed at the outermost position of the pixels PXL in the first and last rows extends outward. Let a width of the sidewall portion CVL1 disposed at the outermost position of the pixels PXL in the first and last rows be referred to as a fourth width W4. Then, the fourth width W4 is less than the second width W2 and is greater than or equal to the third width W3.

As described above, since the sidewall portion CVL1 disposed at the outermost position extends outward in the outermost pixels PXL, a contact area between the sidewall portion CVL1 and the passivation layer PSV increases. Thus, the sidewall portion CVL1 may be prevented from being stripped or removed from the passivation layer PSV.

The second electrode EL2 is disposed on the lower surface of the cover layer CVL and extends in the first direction D1 in which the cover layer CVL extends. Thus, the second electrode EL2 is spaced upward from the passivation layer PSV in the display area DA.

The second electrode EL2 is connected to the common voltage line CML in the non-display area NDA. The second electrode EL2 is connected to the common voltage line CML through a second contact hole CH2 formed through the passivation layer PSV and the color filter part to expose a portion of the common voltage line CML. When the common voltage line CML is disposed on the same layer as the gate line GL, the second contact hole CH2 is formed to penetrate through the passivation layer PSV, the color filter part, and the gate insulating layer GI to expose the portion of the common voltage line CML, and the second electrode EL2 is connected to the common voltage line CML through the second contact hole CH2. The second contact hole CH2 may be provided in several places in the area in which the common voltage line CML is disposed to expose portions of the common voltage line, but is not limited thereto. That is, the second contact hole CH2 may have a slit shape to expose an upper surface of the common voltage line CML in a line shape along the common voltage line CML. The second electrode EL2 receives the common voltage from the common voltage line CML.

The first and second electrodes EL1 and EL2 may be formed of a transparent conductive material or a non-transparent conductive material, such as a metal. That is, the first and second electrodes EL1 and EL2 may include a transparent or non-transparent conductive material in accordance with an operation mode of the display device according to a present exemplary embodiment. For example, when the display device is a transmission type display device in which a backlight unit is disposed under the base substrate BS, the first and second electrodes EL1 and EL2 are formed of a transparent conductive material. When the display device is a reflection type display device that lacks a separate light source, the first electrode EL1 is formed of a non-transparent conductive material that can reflect light and the second electrode EL2 is formed of a transparent conductive material. Transparent conductive materials include a transparent conductive oxide, such as indium tin oxide (ITO), indium zinc oxide (ITO), indium tin zinc oxide (ITZO), etc. Non-transparent conductive materials include metals, such as nickel, chromium, molybdenum, aluminum, titanium, copper, tungsten, or an alloy thereof. Other elements may be the transparent or non-transparent conductive material in accordance with an operation mode of the display device.

The image display layer DSP is disposed in the tunnel-shaped cavity TSC. According to a present exemplary embodiment, the image display layer DSP is disposed between the first electrode EL1 and the second electrode EL, which face each other, and is controlled by an electric field to display the image.

When an electrophoretic layer is used as the image display layer DSP, the electrophoretic layer includes an insulating medium and electrified particles. The insulating medium is a dispersive medium in which the electrified particles are dispersed. The electrified particles are electrophoretic and are dispersed in the insulating medium. The electrified particles move in accordance with an electric field to block or transmit light passing through the electrophoretic layer, thereby displaying a desired image.

When a liquid crystal layer is used as the image display layer DSP, the liquid crystal layer includes optically anisotropic liquid crystal molecules. The liquid crystal molecules are driven by an electric field to block or transmit the light passing through the liquid crystal layer, to thereby display a desired image.

Although not shown in figures, when the image display layer DSP is a liquid crystal layer, an alignment layer (not shown) may be disposed on an upper surface of the passivation layer PSV and a lower surface of the second electrode EL2 in the tunnel-shaped cavity TSC. The alignment layer is used to pretilt the liquid crystal molecules of the liquid crystal layer. However, the alignment layer may be omitted depending on the type of liquid crystal layer or a structure of the first and second electrodes EL1 and EL2. For example, the alignment layer may be omitted when the first and second electrodes EL1 and EL2 have directors, e.g., slits, protrusions, etc.

As described above, the first electrode and the second electrode are spaced apart from each other with the image display layer interposed therebetween, but they are not limited thereto. According to other embodiments, both the first and second electrodes may be disposed at one side of the image display layer. In detail, both the first and second electrodes may be disposed between the substrate and the image display layer. Further, in a present exemplary embodiment, each of the first and second electrodes may be an unpatterned plate, however, in other embodiments, the first and second electrodes may be patterned to have various shapes, thereby controlling directors of the liquid crystal molecules.

The sealant layer SL is disposed on the cover layer CVL. The sealant layer SL covers the display area DA. The sealant layer SL blocks both end portions of the tunnel-shaped cavity TSC to seal the tunnel-shaped cavity TSC. That is, the space is sealed by the passivation layer PSV, the second electrode EL2, and the sealant layer SL.

Although not shown in figures, when the image display layer DSP is a liquid crystal layer, a polarizing plate (not shown) may be disposed on a rear surface of the substrate BS and on the sealant layer SL. Let a polarizing plate disposed on the rear surface of the substrate BS be referred to as a first polarizing plate and the polarizing plate disposed on the sealant layer SL be referred to as a second polarizing plate. Then, light passing through the first polarizing plate is polarized perpendicular to light passing through the second polarizing plate.

In a display device according to a present exemplary embodiment, when a gate signal is applied to the gate electrode GE through the gate line GL and a data signal is applied to the source electrode SE through the data line DL, a conductive channel (hereinafter, referred to as channel) forms in the semiconductor layer SM. Accordingly, the thin film transistor TFT turns on and the image signal is applied to the first electrode EL1, so that an electric field is formed between the first electrode EL1 and the second electrode EL2 to which the common voltage is applied. The liquid crystal molecules of the liquid crystal layer are operated by the electric field, and thus the image is displayed in accordance with an amount of the light passing through the liquid crystal layer LC.

FIG. 4 is a flowchart showing a method of manufacturing a display device according to an exemplary embodiment of the present disclosure. A manufacturing method of a display device will be described in detail with reference to FIGS. 2, 3A to 3C, and 4.

First, a gate line part is formed on the substrate BS. The gate line part includes the gate line GL and the gate electrode GE.

The gate line part is formed of a conductive material, such as a metal. For example, the gate line part is formed by forming a metal layer over the substrate BS and patterning the metal layer through a photolithography process to form the gate line GL and the gate electrode GE. The gate line part may have a single-layer structure of a single metal or alloy, but is not limited to a single-layer structure. That is, the gate line part may have a multi-layer structure of two or more metals and/or a metal alloy.

The gate insulating layer GI is formed on the gate line part and the semiconductor layer SM is formed on the gate insulating layer GI. The semiconductor layer SM is disposed on the gate electrode GE and overlaps at least a portion of the gate electrode GE. The semiconductor layer SM may be formed of a doped or non-doped silicon or oxide semiconductor.

A data line part is formed on the semiconductor layer SM. The data line part includes the data line DL, the source electrode SE, the drain electrode DE, the common voltage line CML, and the pad part PP.

The data line part is formed of a conductive material, such as a metal. For example, the data line part is formed by forming a metal layer over the substrate BS and patterning the metal layer through a photolithography process to form a data line, a source electrode, a drain electrode, a common voltage line, and a pad part. The data line part may have a single-layer structure of a single metal or alloy, but is not limited to a single-layer structure. That is, the gate line part may have a multi-layer structure of two or more metals and/or a metal alloy.

The gate electrode GE, the source electrode SE, the drain electrode DE, and the semiconductor layer SM, which are formed by the above-mentioned processes, form the thin film transistor TFT (S110).

The color filter part is formed on the substrate BS on which the data line part is formed (S120) and the contact hole CH1 is formed to expose a portion of the drain electrode DE.

The color filter part is formed by forming the color filter CF and the black matrix BM. The color filter CF is formed by forming a color layer for each of a red color, a green color, a blue color, or others on the substrate BS, and patterning the color layer using a photolithograph process. The method of forming the color filter CF is not limited thereto. The color filter CF may be formed by an inkjet method instead of a photolithography process. The black matrix BM may be formed by forming a light blocking layer that absorbs light on the substrate BS and patterning the light blocking layer using a photolithography process. Alternatively, the black matrix BM may be formed by an inkjet method. The order of forming the color layer of the color filter CF and the black matrix BM may vary. For example, the black matrix BM may be formed after the red, green, and blue color layers are formed, or the red, green, and blue color layers may be formed after the black matrix BM is formed. In addition, the order of forming the color layers may vary.

The first contact hole CH1 is formed by removing a portion of the gate insulating layer GI and the color filter part using a photolithography process.

In an embodiment of the present disclosure, although not shown in figures, an additional insulating layer, such as a passivation layer, may be selectively formed between the thin film transistor TFT and the color filter part. The additional insulation layer protects the channel portion of the thin film transistor TFT and prevents impurities from diffusing into the thin film transistor TFT from the color filter layer.

The first electrode EL1 is formed on the color filter part (S130).

The first electrode EL1 is formed by forming a conductive layer on the color filter part using a conductive material and patterning the conductive layer through a photolithography process. The first electrode EL1 connects to the drain electrode DE through the first contact hole CH1.

The passivation layer PSV is formed on the first electrode EL1 to protect the first electrode EL1 and the second contact hole CH2 is formed to expose a portion of the common voltage line CML. The second contact hole CH2 is formed by patterning a portion of the gate insulating layer GI, the color filter part, and the passivation layer PSV.

A sacrificial layer (not shown) is formed on the passivation layer PSV (S140).

The sacrificial layer is formed to cover the area in which the image display layer is formed, and extends in the second direction D2. That is, the sacrificial layer has a bar shape that extends along the column of the pixels, but is not limited thereto. The sacrificial layer may extend in the first direction D1. The sacrificial layer includes an organic polymer material. When a sacrificial layer is formed of a photosensitive polymer material, the sacrificial layer may be formed by patterning the photosensitive polymer material.

The sacrificial layer is formed in the area in which the image display layer DSP is formed to have a width and height respectively corresponding to a width and height of the tunnel-shaped cavity TSC since the sacrificial layer is removed to form the tunnel-shaped cavity TSC.

The second electrode EL2 is formed on the sacrificial layer (S150). The second electrode EL2 is formed by forming a conductive layer on the sacrificial layer and the passivation layer using the conductive material and patterning the conductive layer using a photolithography process.

The cover layer CVL is formed on the substrate BS on which the second electrode EL2 is formed (S160). The cover layer CVL may be formed of an organic or an inorganic insulating material. The cover layer CVL is not formed at both end portions of the display area DA in the second direction D2 except for those pixels in a first row and a last row. Thus, an upper surface of the sacrificial layer is exposed in the area corresponding to the both end portions of the display area DA in the second direction D2.

A portion of the cover layer CVL that is formed over the sacrificial layer corresponds to the cover portion CVL2, and a portion of the cover layer CVL that is formed in an area in which the sacrificial layer is not formed corresponds to the sidewall portion CVL1. A portion of the sidewall portion CVL1 extends outward into an area corresponding to the pixels PXL disposed at the outermost position. In detail, the sidewall portion CVL1 disposed at the outermost position of the pixels PXL in the first and last columns extends outward. In addition, the sidewall portion CVL1 disposed at the outermost position of the pixels PXL in the first and last rows extends outward.

Then, the sacrificial layer is removed by a dry etch process or a wet etch process to form the tunnel-shaped cavity TSC (S170). The sacrificial layer is etched from the exposed upper surface thereof. Thus, the upper surface of the passivation layer PSV and the lower surface of the second electrode EL2, which correspond to the area in which the image display layer is formed, are exposed, and the tunnel-shaped cavity TSC is defined by the upper surface of the passivation layer PSV, the lower surface of the second electrode EL2, and the end portions in the second direction D2 of the display area DA. A dry etch process may be performed using plasma, and a wet etch process may be performed using various etchants based on the materials used to form the sacrificial layer. Here, for the pixels in the first and last rows, one end portion of the tunnel-shaped cavity TSC is sealed, but the other end portion of the tunnel-shaped cavity TSC is left open, and thus the sacrificial layer may be removed through the open end portion.

In the pixels PXL disposed at the outermost position, since the sidewall portion CVL1 disposed at the outermost position extends outward, the contact area between the sidewall portion CVL1 and the passivation layer PSV is increased. Thus, the sidewall portion CVL1 may be prevented from being stripped or removed from the passivation layer PSV when the sacrificial layer is removed. In addition, when the cover layer CVL includes an organic material, the sidewall portion CVL1 may be exposed to high temperatures when the organic material is cured. As described above, since the contact area between the sidewall portion CVL1 and the passivation layer PSV is increased, the sidewall portion CVL1 may be prevented from being stripped or removed from the passivation layer PSV.

In an embodiment of the present disclosure, an inorganic insulating layer is formed on the sacrificial layer before the second electrode EL2 is formed and an additional inorganic insulating layer is formed on the second electrode EL2 before the cover layer CVL is formed. The inorganic insulating layer supports the cover layer CVL to allow the cover layer CVL to stably support the tunnel-shaped cavity TSC when the sacrificial layer is etched.

The image display layer DSP, such as a liquid crystal layer, is formed in the tunnel-shaped cavity TSC (S180). Since a liquid crystal is a type of fluid, the liquid crystal molecules can flow into the tunnel-shaped cavity TSC by capillary action when the liquid crystal molecules are provided to the tunnel-shaped cavity TSC. The liquid crystal molecules may be provided to the tunnel-shaped cavity TSC using an inkjet device employing a micropipette. Alternatively, the liquid crystal layer LC may be provided to the tunnel-shaped cavity TSC using a vacuum liquid crystal injection device. To this end, a portion of the substrate BS in which the tunnel-shaped cavity TSC is formed is dipped into a vessel in a chamber in which a liquid crystal material is filled, and a pressure of the chamber is lowered. As a result, the liquid crystal material flows into the tunnel-shaped cavity TSC by capillary action.

In an embodiment of the present disclosure, the alignment layer may be formed in the tunnel-shaped cavity TSC based on a display mode of the display device according to a present exemplary embodiment. The alignment layer may be formed using an alignment solution before the image display layer DSP is formed. The alignment solution is obtained by mixing an alignment material, such as a polyimide, with a solvent. Since the alignment solution is provided in a fluid, the alignment solution flows into the tunnel-shaped cavity by capillary action when the alignment solution is provided to the tunnel-shaped cavity TSC. The alignment solution may be provided to the tunnel-shaped cavity by using an inkjet device employing a micropipette or by using a vacuum injection device. Then, the solvent is removed. To remove the solvent, the substrate is maintained at room temperature or heated.

In some embodiments, the alignment layer may be omitted based on the type of the liquid crystal layer or the structure of the first and second electrodes EL1 and EL2. For example, the alignment layer may be omitted when the second electrode EL2 is patterned to have a specific shape and no separate alignment is required. In addition, if the image display layer DSP includes a reactive mesogen, then a separate process of forming the alignment layer may be omitted since an alignment layer can be formed by polymerizing the reactive mesogen.

Then, the liquid crystal is removed from all areas except for the area in which the tunnel-shaped cavity TSC is formed, and the sealant layer SL is formed to surround the tunnel-shaped cavity TSC (S190). The sealant layer SL seals the opening portion of the tunnel-shaped cavity TSC, i.e., the inlet through which the liquid crystal molecules are injected by capillary action.

The sealant layer SL may be formed by a deposition method or a coating method using an organic polymer.

After the sealant layer SL is formed, the first and second polarizing plates are disposed on the lower surface of the substrate BS and the upper surface of the sealant layer SL, respectively. The first and second polarizing plates polarize light passing through the liquid crystal layer. The first polarizing plate has a transmission axis substantially perpendicular to a transmission axis of the second polarizing plate. The first polarizing plate is attached to the lower surface of the substrate BS using an adhesive member.

A display device having the above-mentioned structure will not be substantially deformed by stress occurring when the display device is manufactured, which may reduce the defects caused by the deformations. In addition, the display device has high stress resistance to external impacts or heat, which may improve the reliability of the display device.

Figure 5A:
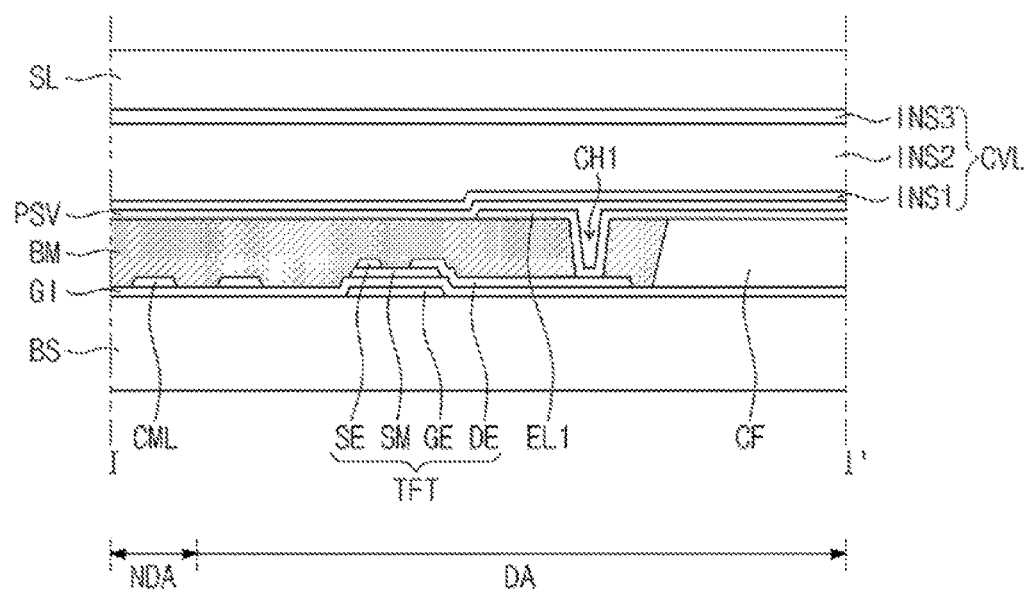
FIG. 5A is a cross-sectional view of a display device according to another exemplary embodiment of the present disclosure, which corresponds to the line I-I' shown in FIG. 2.
Figure 5B:
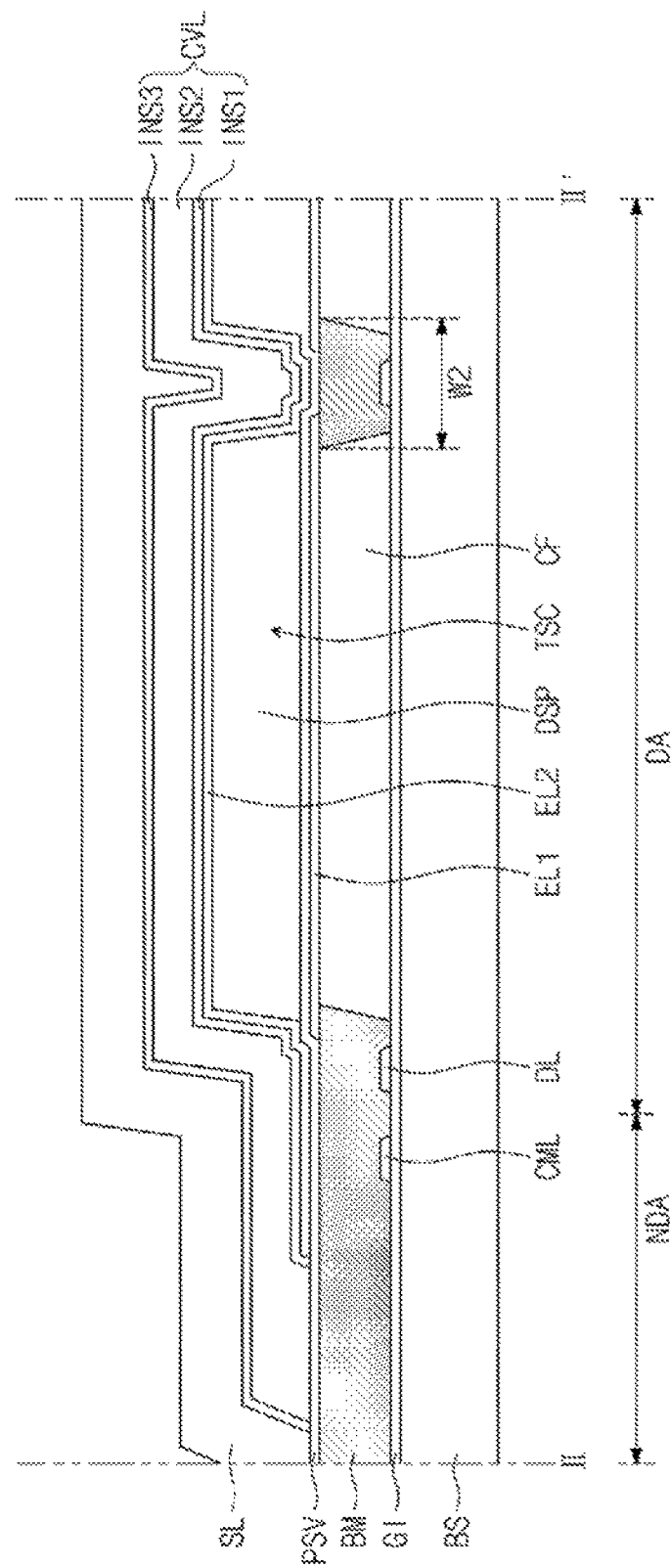
FIG. 5B is a cross-sectional view of a display device according to another exemplary embodiment of the present disclosure, which corresponds to the line II-II' shown in FIG. 2.

FIG. 5A is a cross-sectional view of a display device according to another exemplary embodiment of the present disclosure, which corresponds to the line I-I' shown in FIG. 2, FIG. 5B is a cross-sectional view of a display device according to another exemplary embodiment of the present disclosure, which corresponds to the line II-II' shown in FIG. 2, and FIG. 5C is a cross-sectional view of a display device according to another exemplary embodiment of the present disclosure, which corresponds to the line III-III' shown in FIG. 2. In FIGS. 5A to 5C, for the convenience of explanation, detailed descriptions of the same elements in FIGS. 1 to 4 will be omitted to avoid redundancy.

According to a present exemplary embodiment, a cover layer CVL of each pixel PXL includes a plurality of sequentially stacked insulating layers. For example, the cover layer CVL may have a double-layer structure or a triple-layer structure. Let the sequentially stacked insulating layers of the cover layer CVL be referred to as the first, second, and third insulating layers INS1, INS2, and INS3, respectively. Then, the first insulating layer INS1 may be an inorganic insulating layer, the second insulating layer INS2 may be an organic insulating layer, and the third insulating layer INS3 may be the inorganic insulating layer. The first and third insulating layers INS1 and INS3 may include silicon nitride or silicon oxide.

The first to third insulating layers INS1 to INS3 may be formed of a transparent material.

The first insulating layer INS1 is formed to cover the second electrode EL2. The first insulating layer INS1 is formed using a photolithography process. In detail, a first insulating layer is formed on the second electrode EL2 and a photoresist is coated on the first insulating material. Then, the photoresist is patterned through an exposure and development process and the first insulating material is patterned using the photoresist pattern as a mask, thereby forming the first insulating layer INS1.

The first insulating layer INS1 prevents impurities from diffusing into the second electrode EL2 from the second insulating layer INS2 and supports the cover layer CVL such that the cover layer CVL is maintained spaced apart from the substrate BS.

The second insulating layer INS2 is formed to cover the first insulating layer INS1. The second insulating layer INS2 serves as a roof layer to support the cover layer CVL, so that the cover layer CVL is maintained spaced apart from the substrate BS.

The second insulating layer INS2 is formed by a photolithography process. In detail, the second insulating layer INS2 is formed by forming an organic photosensitive material layer on the first insulating layer INS1 and the passivation layer PSV, exposing and developing the organic photosensitive material layer, and curing the patterned organic photosensitive material layer. A portion of the second insulating layer INS2 extends outward, corresponding to pixels PXL disposed at the outermost position. In detail, the portion of the second insulating layer INS2 disposed at the outermost position of the pixels PXL in the first and last columns extends outward. In addition, the portion of the second insulating layer INS2 disposed at the outermost position of the pixels PXL in the first and last rows extends outward. The second insulating layer INS2 makes contact with the upper surface of the first insulating layer INS1 and the passivation layer. Accordingly, the second insulating layer INS2 may be prevented from being stripped or removed when heat is applied to cure the material for the second insulating layer INS2.

The third insulating layer INS3 is formed to completely cover the second insulating layer INS2. The third insulating layer INS3 serves as a roof layer to support the cover layer CVL, so that the cover layer CVL is maintained spaced apart from the substrate BS. In addition, the third insulating layer INS3 prevents the second insulating layer INS2 from being etched when the sacrificial layer is wet-etched or dry-etched.

The third insulating layer INS3 is formed using a photolithography process. In detail, a third insulating layer is formed on the second insulating layer INS2 and a photoresist is coated on the third insulating material. Then, the photoresist is patterned through an exposure and development process and the third insulating material is patterned using the photoresist pattern as a mask, thereby forming the third insulating layer INS3.

Figure 6:
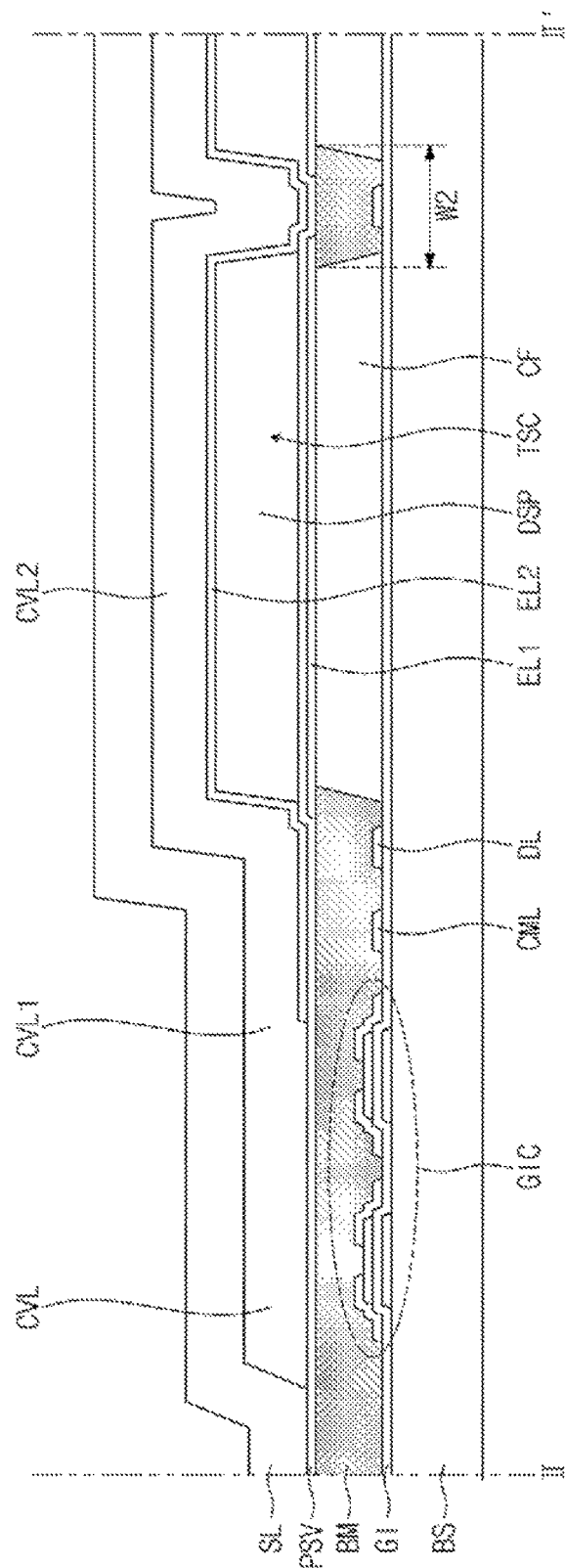
FIG. 6 is a cross-sectional view of a display device that shows a gate driving circuit according to another exemplary embodiment of the present disclosure, which corresponds to the line II-II' shown in FIG. 2.

FIG. 6 is a cross-sectional view of a display device that shows a gate driving circuit according to another exemplary embodiment of the present disclosure, which corresponds to the line II-II' shown in FIG. 2. In FIG. 6, for the convenience of explanation, detailed descriptions of the same elements in FIGS. 1 to 4 will be omitted to avoid redundancy.

Referring to FIG. 6, a portion of the sidewall portion CVL1 extends outward, corresponding to the pixels PXL disposed at the outermost position. In particular, the sidewall portion CVL1 disposed at the outermost position of the pixels PXL in the first column extends outward in the first direction D1 to the area in which the gate driving circuit GIC is formed. That is, the sidewall portion CVL1 disposed at the outermost position of the pixels PXL in the first row covers the gate driving circuit GIC.

In a present exemplary embodiment, the gate driving circuit GIC includes a plurality of thin film transistors. FIG. 6 shows two thin film transistors as an example, but the number of the thin film transistor included in the gate driving circuit GIC is not limited to two. The gate driving circuit GIC is disposed on the substrate BS and is formed of a doped or non-doped silicon or oxide semiconductor. In addition, the gate driving circuit GIC may include an amorphous silicon semiconductor thin film layer. The gate driving circuit GIC may be formed together with the thin film transistor TFT in each pixel PXL of the display area DA.

As described above, the sidewall portion covers the gate driving circuit and may prevent the gate driving circuit from being damaged by static electricity. In particular, a display device according to a present exemplary embodiment does not include an upper substrate, and thus the gate driving circuit may be vulnerable to the static electricity. However, since an insulating sidewall covers the gate driving circuit, the gate driving circuit may be protected from the static electricity.

Figure 7:
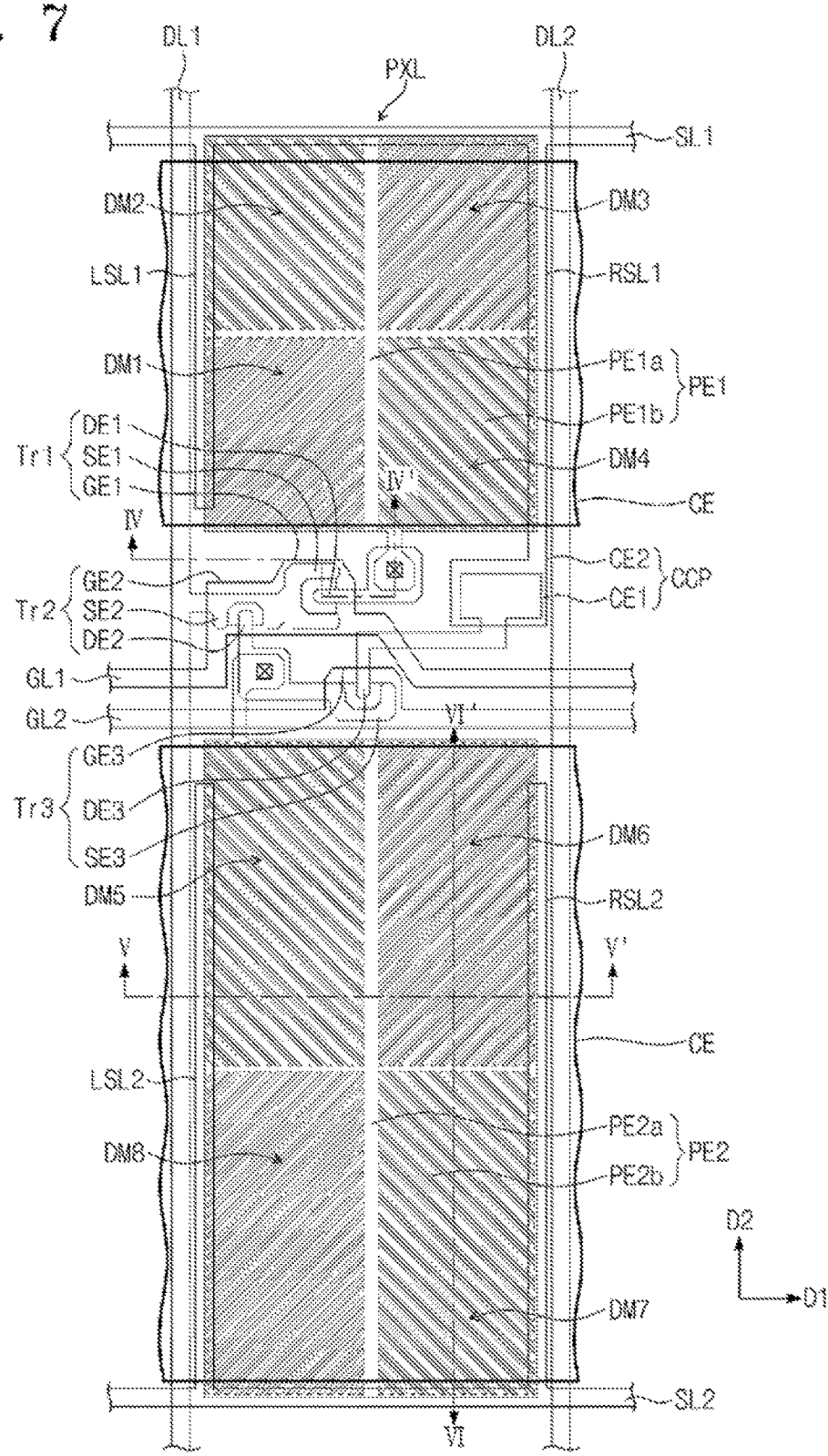
FIG. 7 is a plan view of one pixel of a display device according to another exemplary embodiment of the present disclosure.
Figure 8A:
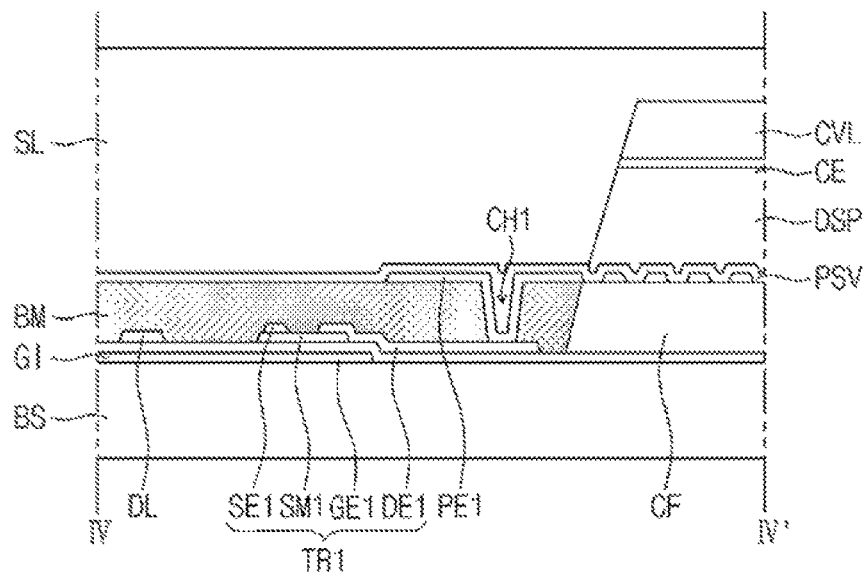
FIG. 8A is a cross-sectional view taken along a line IV-IV' shown in FIG. 7.
Figure 8B:
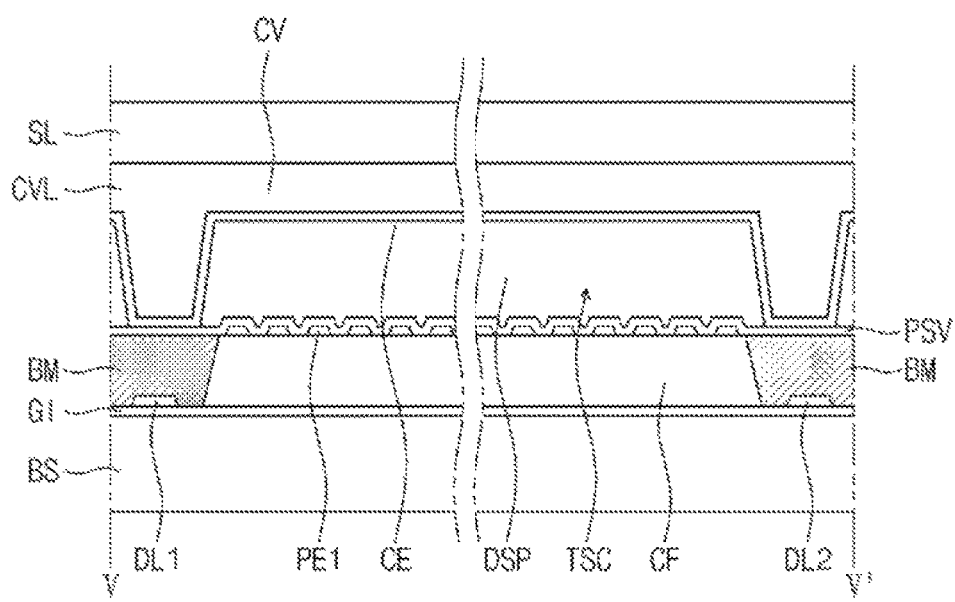
FIG. 8B is a cross-sectional view taken along a line V-V' shown in FIG. 7.
Figure 8C:
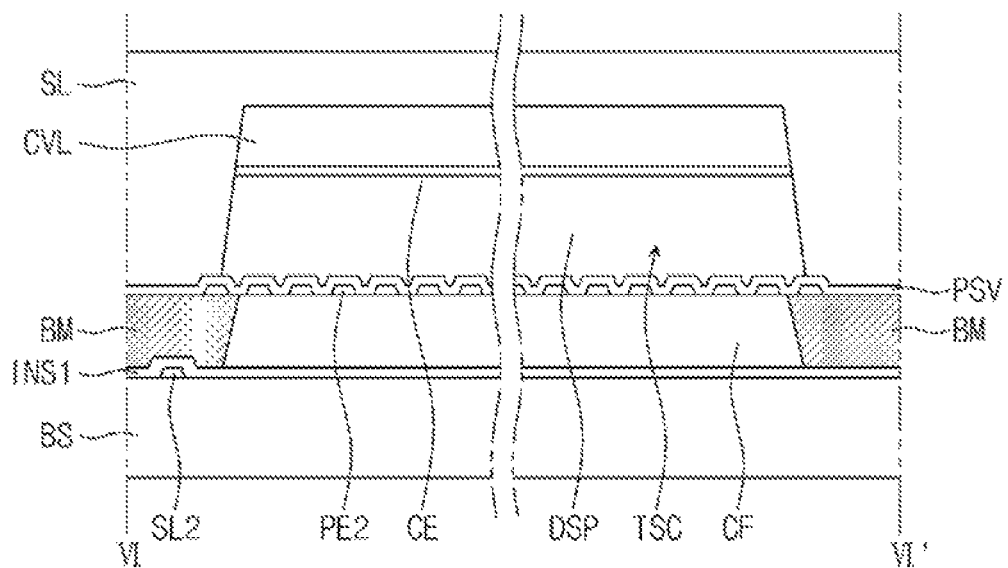
FIG. 8C is a cross-sectional view taken along a line VI-VI' shown in FIG. 7.

Other exemplary embodiments of the present disclosure may have different pixel structures. FIG. 7 is a plan view of one pixel of a display device according to another exemplary embodiment of the present disclosure, FIG. 8A is a cross-sectional view taken along a line IV-IV' shown in FIG. 7, FIG. 8B is a cross-sectional view taken along a line V-V' shown in FIG. 7, and FIG. 8C is a cross-sectional view taken along a line VI-VI' shown in FIG. 7.

Referring to FIGS. 7 and 8A to 8C, a display device includes a substrate BS and a plurality of pixels PXL disposed on the substrate BS.

A line part that applies signals to the pixels PXL and a thin film transistor that drives the pixels PXL are disposed on the substrate BS.

The line part includes gate lines, data lines, and first and second storage electrode parts. Accordingly, detailed descriptions of the same elements of the line part as those of the above-mentioned embodiments will be omitted. In a present exemplary embodiment, two gate lines disposed adjacent to the one pixel may be referred to as first and second gate lines GL1 and GL2, and two data lines disposed adjacent to the one pixel may be referred to as first and second data lines DL1 and DL2.

The first and second gate lines GL1 and GL2 extend in the first direction D1 on the substrate BS substantially parallel to each other. The first and second data lines DL1 and DL2 extend in the second direction D2 crossing the first direction D1 substantially parallel to each other.

The thin film transistor includes first, second, and third thin film transistors Tr1, Tr2, and Tr3.

The first thin film transistor Tr1 is connected to the first data line DL1 and the first gate line GL1. The first thin film transistor Tr1 includes a first gate electrode GE1 branched from the first gate line GL1, a first source electrode SE1 branched from the first data line DL1, and a first drain electrode DE1 connected to a first sub-pixel electrode PE1.

The first storage electrode part includes a first storage line SL1 that extends in the first direction D1 and first and second branch electrodes LSL1 and RSL1 branched from the first storage line SL1 that extend in the second direction D2.

The second thin film transistor Tr2 includes a second gate electrode GE2 branched from the first gate line GL1, a second source electrode SE2 branched from the first data line DL1, and a second drain electrode DE2 electrically connected to a second sub-pixel electrode PE2.

The second storage electrode part includes a second storage line SL2 that extends in the second direction D2 and third and fourth branch electrodes LSL2 and RSL2 branched from the second storage line SL2 that extend in the second direction D2.

The third thin film transistor Tr3 includes a third gate electrode GE3 branched from the second gate line GL2, a third source electrode SE3 that extends from the second drain electrode DE2, and a third drain electrode DE3 connected to a coupling capacitor CCP.

The coupling capacitor CCP includes a coupling capacitor electrode CE1 connected to the third drain electrode DE3 and an opposite electrode CE2 that extends from the second branch electrode RSL1, but the structure of the coupling capacitor CCP is not limited thereto.

A color filter part is disposed on the thin film transistor TFT. The color filter part includes color filters CF and a black matrix BM. The color filters CF are disposed to respectively correspond to the pixel areas.

The pixels PXL are disposed on the substrate BS, i.e., on the color filter part. Each pixel PXL includes a cover layer CVL that defines the tunnel-shaped cavity TSC on the substrate BS, an image display layer DSP disposed in the tunnel-shaped cavity, an electrode that controls the image display layer DSP, and a sealant layer SL that seals the tunnel-shape cavity.

The electrode includes a pixel electrode and a common electrode CE insulated from the pixel electrode to form the electric field in the image display layer DSP. The pixel electrode includes a first sub-pixel PE1 and a second sub-pixel PE2.

The first sub-pixel electrode PE1 is electrically connected to the first drain electrode DE1 of the first thin film transistor Tr1.

The first sub-pixel electrode PE1 partially overlaps the first storage line SL1 and the first and second branch electrodes LSL1 and RSL1 to form a first storage capacitor.

The first sub-pixel electrode PE1 includes a trunk portion PE1a and a plurality of branch portions PE1b that radially extend from the trunk portion PE1a.

The trunk portion PE1a may have a cross shape. In this case, the first sub-pixel electrode PE1 is divided into a plurality of domains by the trunk portion PE1a. The branch portions PE1b extend in different directions according to the domains. In a present exemplary embodiment, the first sub-pixel electrode PE1 includes first, second, third, and fourth domains DM1, DM2, DM3, and DM4. In each domain, the branch portions PE1b extend substantially parallel to each other and are spaced apart from each other. The spacing of the adjacent branch portions PE1b is on the order of a micrometer. Due to the above-mentioned structure, liquid crystal molecules of a liquid crystal layer may be aligned at a specific azimuth on a plane parallel to the substrate BS.

The second sub-pixel electrode PE2 is electrically connected to the second drain electrode DE2 of the second thin film transistor Tr2.

The second sub-pixel electrode PE2 partially overlaps the second storage line SL2 and the third and fourth branch electrodes LSL2 and RSL2 to form a second storage capacitor.

The second sub-pixel electrode PE2 includes a trunk portion PE2a and a plurality of branch portions PE2b that radially extend from the trunk portion PE2a. The trunk portion PE2a may have the cross shape. In this case, the second sub-pixel electrode PE2 is divided into a plurality of domains by the trunk portion PE2a. The branch portions PE2b extend in different directions according to the domains. In a present exemplary embodiment, the second sub-pixel electrode PE2 includes fifth, sixth, seventh, and eighth domains DM5, DM6, DM7, and DM8. In each domain, the branch portions PE2b extend substantially parallel to each other and are spaced apart from each other. The spacing of adjacent branch portions PE2b is on the order of a micrometer. Due to the above-mentioned structure, liquid crystal molecules of a liquid crystal layer may be aligned at a specific azimuth on a plane parallel to the substrate BS.

In a present exemplary embodiment, the liquid crystal molecules are aligned in different directions according to each domain and the first and second sub-pixel electrodes are applied with different voltage levels. Therefore, the alignment angles of the liquid crystal molecules may be controlled in different ways, which may improve a viewing angle of the display device.

Although the exemplary embodiments of the present disclosure have been described, it is understood that the present disclosure should not be limited to these exemplary embodiments but various changes and modifications can be made by one ordinary skilled in the art within the spirit and scope of the present disclosure as hereinafter claimed.

What is claimed is:

1. A display device comprising:
    a substrate having a display area and a non-display area disposed adjacent to a side of the display area;
    a base layer disposed on the substrate;
    a plurality of pixel rows arranged in the display area, each of the plurality of pixel rows includes a plurality of pixels;
    a plurality of cover layers corresponding to the plurality of pixel rows, each of the plurality of cover layers provides a plurality of cavities corresponding to the plurality of pixels on the base layer; and
    a sealant layer that seals the plurality of cavities, wherein each of the plurality of pixels comprises;
        an image display part disposed in a corresponding cavity of the plurality of cavities; and
        an electrode part that applies an electric field to the image display part,
    wherein the each of the plurality of cover layers comprises;
        sidewall portions contacted with the base layer; and
        cover portions spaced apart from the base layer, connected to the sidewall portions, and corresponded to plurality of cavities,
    wherein the sidewall portions and the cover portions are integrally formed in an inseparable single body, and
    a width of one sidewall portion of the sidewall portions disposed at an outermost position in the each of the plurality of pixel rows is greater than a width of another sidewall portion of the sidewall portions disposed at an inner position in the each of the plurality of pixel rows.

2. The display device of claim 1, wherein plurality of pixel rows includes a first pixel row, a last pixel row, and middle pixel rows disposed between the first pixel row and the last pixel row,
    the plurality of cover layers includes a first cover layer corresponding to the first pixel row, and
    the first cover layer further comprises supplemental sidewall portions contacted with the base layer and connected to the cover portions to seal one side each of the plurality of cavities corresponding to the first pixel low.

3. The display device of claim 1, further comprising:
    color filters corresponding to the plurality of pixels disposed between the substrate and the base layer; and
    a black matrix that surrounds the color filters, wherein a width of the black matrix in the each of the plurality of pixel rows is greater than the width of the another sidewall portion of the sidewall portions disposed at the inner position in the each of the plurality of pixel rows, and the black matrix extends into the non-display area to cover at least a portion of the non-display area.

4. The display device of claim 1, wherein the each of the plurality of pixels further comprising:
    a thin film transistor disposed on the substrate and connected to the electrode part; and
    a gate line that extends in a row direction and a data line that extends in a column direction, which are disposed on the substrate and connected to the thin film transistor,
    wherein the gate line and the data line are connected to the thin film transistor to apply signals to the thin film transistor, and corresponding sidewall portion of the sidewall portions overlaps the data line.

5. The display device of claim 4, further comprising a gate driving circuit disposed adjacent to at least one side of the display area to apply a gate signal to the gate line.

6. The display device of claim 5, wherein the one sidewall portion of the sidewall portions disposed at an outermost position in the each of the plurality of pixel row covers the gate driving circuit.

7. The display device of claim 1, further comprising a common voltage line, wherein the electrode part comprises a first electrode connected to the thin film transistor and a second electrode insulated from the first electrode, and the common voltage line makes contact with at least a portion of the second electrode to apply a common voltage to the second electrode.

8. The display device of claim 1, wherein each of plurality of cover layers comprises a plurality of insulating layers sequentially stacked on the substrate.

9. The display device of claim 8, wherein the cover layer comprises a first inorganic insulating layer, an organic insulating layer, and a second inorganic insulating layer, which are sequentially stacked on the substrate.

10. The display device of claim 1, wherein the image display part is one of a liquid crystal layer or an electrophoretic layer.

11. A display device comprising:
a substrate having a display area and a non-display area disposed adjacent to a side of the display area;
a base layer disposed on the substrate;
a plurality of pixel rows arranged in the display area, the plurality of pixel rows includes a first pixel row, a last pixel row, and middle pixel rows disposed between the first pixel row and the last pixel row, and each of the first pixel row, the last pixel row, and the middle pixel rows includes a plurality of pixels;
cover layers including a first cover layer corresponding to the first pixel row, the first cover layer provides a plurality of cavities corresponding to the plurality of pixels of the first pixel row; and
a sealant layer that seals the plurality of cavities,
wherein each of the plurality of pixels comprises;
an image display part disposed in a corresponding cavity of the plurality of cavities; and
an electrode part that applies an electric field to the image display part,
wherein the first cover layer comprises;
first sidewall portions contacted with the base layer and arranged in a row direction;
cover portions spaced apart from the base layer, connected to the first sidewall portions, and corresponded to plurality of cavities; and
second sidewall portions contacted with the base layer and connected to the cover portions and the first side wall portions to seal one side each of the plurality of cavities corresponding to the first pixel row,
wherein the first sidewall portions, the cover portions, and second sidewall portions are integrally formed in an inseparable single body.

12. The display device of claim 11, wherein a width of one first sidewall portion of the first sidewall portions disposed at an outermost position in the first pixel rows is greater than a width of another first sidewall portion of the first sidewall portions disposed at an inner position in the first pixel rows.

13. The display device of claim 12, wherein a width of one second sidewall portion of the second sidewall portions is greater than the width of the another first sidewall portion of the first sidewall portions.

14. The display device of claim 11, wherein the second sidewall portions overlaps with the non-display area.

15. The display device of claim 11, further comprising:
color filters corresponding to the plurality of pixels disposed between the substrate and the base layer; and
a black matrix that surrounds the color filters, wherein a width of the black matrix in the first pixel rows is greater than the width of the another sidewall portion of the sidewall portions, and the black matrix extends into the non-display area to cover at least a portion of the non-display area.

16. The display device of claim 11, wherein each of cover layers comprises a plurality of insulating layers sequentially stacked on the substrate.

17. A display device comprising:
a substrate having a display area and a non-display area disposed adjacent to a side of the display area;
a base layer disposed on the substrate;
a first pixel row, a last pixel row, and middle pixel rows disposed between the first pixel row and the last pixel row, the first pixel row includes a plurality of pixels;
a first cover layer and a second cover layer corresponding to the first pixel row, the first cover layer provides a plurality of first cavities corresponding to the plurality of pixels of the first pixel row and the second cover layer provides a plurality of second cavities corresponding to the plurality of pixels of the first pixel row; and
a sealant layer that seals the plurality of the first cavities and the plurality of the second cavities,
wherein each of the plurality of pixels comprises;
a first sub-pixel electrode;
a second sub-pixel electrode apart from the first sub-pixel electrode in the column direction;
a common electrode overlapped with the first sub-pixel electrode and the second sub-pixel electrode;
thin film transistors disposed between the first sub-pixel electrode and the second sub-pixel electrode in the column direction;
a first image display part disposed in a corresponding first cavity of the plurality of the first cavities; and
a second image display part disposed in a corresponding second cavity of the plurality of the second cavities;
wherein the first cover layer comprises;
sidewall portions contacted with the base layer; and
cover portions spaced apart from the base layer, connected to the sidewall portions, corresponded to plurality of first cavities, and overlapped with first sub-pixel electrodes of the plurality of pixels,
wherein the sidewall portions and the cover portions are integrally formed in an inseparable single body, and
a width of one sidewall portion of the sidewall portions disposed at an outermost position in the first pixel row is greater than a width of another sidewall portion of the sidewall portions disposed at an inner position in the first pixel row.

18. The display device of claim 17, wherein the thin film transistors are connected to the first sub-pixel electrode and the second sub-pixel electrode.

19. The display device of claim 17, the first cover layer further comprises supplemental sidewall portions contacted with the base layer and connected to the cover portions and the sidewall portions to seal one side each of the plurality of first cavities.

20. The display device of claim 17, wherein the first cover layer comprises a plurality of insulating layers sequentially stacked on the substrate.

* * * * *